(12) United States Patent
Correale, Jr. et al.

(10) Patent No.: US 7,395,372 B2
(45) Date of Patent: Jul. 1, 2008

(54) METHOD AND SYSTEM FOR PROVIDING CACHE SET SELECTION WHICH IS POWER OPTIMIZED

(75) Inventors: Anthony Correale, Jr., Raleigh, NC (US); James N. Dieffenderfer, Apex, NC (US); Robert L. Goldiez, Apex, NC (US); Thomas P. Speier, Holly Springs, NC (US); William R. Reohr, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 10/714,105

(22) Filed: Nov. 14, 2003

(65) Prior Publication Data
US 2005/0108480 A1     May 19, 2005

(51) Int. Cl.
*G06F 13/00* (2006.01)
*G06F 1/32* (2006.01)

(52) U.S. Cl. .................. 711/128; 711/118; 713/322; 713/500

(58) Field of Classification Search .................. None
See application file for complete search history.

(56) References Cited

U.S. PATENT DOCUMENTS

| | | | | |
|---|---|---|---|---|
| 584,428 | A * | 6/1897 | Collins | 138/124 |
| 4,912,626 | A * | 3/1990 | Fiacconi | 711/124 |
| 5,148,922 | A | 9/1992 | Marriott | |
| 5,235,697 | A | 8/1993 | Steely, Jr. et al. | |
| 5,918,245 | A | 6/1999 | Yung | |
| 5,920,888 | A * | 7/1999 | Shirotori et al. | 711/128 |
| 6,356,990 | B1 * | 3/2002 | Aoki et al. | 711/205 |
| 2003/0149905 | A1 * | 8/2003 | Santhanam et al. | 713/500 |
| 2005/0063211 | A1 * | 3/2005 | Atallah et al. | 365/145 |

OTHER PUBLICATIONS

Customizing the Branch Predictor to Reduce Complexity and Energy Consumption, by Michal C. Huang et al. (published by IEEE Computer Society, 0272-1732/03, Sep.-Oct. 2003), pp. 12-24.*

(Continued)

*Primary Examiner*—Hyung Sough
*Assistant Examiner*—Kaushik Patel
(74) *Attorney, Agent, or Firm*—Connolly Bove Lodge & Hutz LLP; Josh Cockburn

(57) ABSTRACT

A system and method for accessing a data cache having at least two ways for storing data at the same addresses. A first and second tag memory store first and second sets of tags identifying data stored in each of the ways. A translation device determines from a system address a tag identifying one of the ways. A first comparator compares tags in the address with a tag stored in the first tag memory. A second comparator compares a tag in the address with a tag stored in the second tag memory. A clock signal supplies clock signals to one or both of the ways in response to an access mode signal. The system can be operated so that either both ways of the associative data cache are clocked, in a high speed access mode, or it can apply clock signals to only one of the ways selected by an output from the first and second comparators in a power efficient mode of operation.

16 Claims, 4 Drawing Sheets

OTHER PUBLICATIONS

Steve Dropsho et al, "Integrating Adaptive On-Chip Storage Structures for Reduced Dynamic Power", 2002 IEEE—Proceedings of the 2002 International Conference on Parallel Architectures and Compilation Techniques (PACT'02).

S. Kaneko et al., A 600MHz Single-Chip Multiprocessor With 4.8GB/s Internal Shared Pipelined Bus and 512kB Internal Memory, ISSCC 2003/Session 14/Microprocessors/Paper 14.5, pp. 254-255.

* cited by examiner

Power vs. Frequency for 'Single Set Selection'

METHOD AND SYSTEM FOR PROVIDING CACHE SET SELECTION WHICH IS POWER OPTIMIZED

BACKGROUND OF THE INVENTION

The present invention relates to instruction and data caches used in micro processor based computing systems for temporarily storing instructions and data. Specifically, a system and method are described which can address the associative cache in a high speed mode, or in a mode which conserves power.

Computing systems, including micro-processor based systems, use a cache in conjunction with a main memory to hold data and/or instructions which are being processed. The cache comprises a memory where the temporary contents needed for processing are maintained so that the most recently used data from a main memory is located in a cache memory for rapid access by the micro-processor system.

Cache memories are organized as set associative comprising sets of individual SRAMs which contain the desired data and which typically have common address lines. Each SRAM is referred to as a way, and in a two-way associative cache, common address lines are connected to each SRAM. Lines of multi byte data are stored in each location of the ways. The information contained within a line of the set associative cache memory is derived by an effective address 20 generated by the microprocessor system. The effective address includes a tag field, a line index field and a byte field. The tag field of an effective address is utilized to determine whether or not one or the other ways contains the data being sought.

Both ways may be simultaneously addressed, and data from one or the other of the ways may be selected by a multiplexer by comparing a tag derived from the address applied to the ways of the associative cache to a tag contained in a tag memory or directory. The tag memory includes a row of tag data corresponding to the same row number of data in a given way. Thus, a comparison between the contents of a row of a tag memory and a tag from the tag memory determines which way contains the desired data and a multiplexer selects the desired data from the identified way.

In small computing systems, power efficiency becomes more important than was previously the case in earlier applications of set associative cache memories. Associative cache memories provide for higher speed data access when both ways are simultaneously addressed and clocked, and a late select command to the multiplexer selects the data from one of the ways. While this provides for optimum access speed, power is dissipated in each of the SRAMs of the associative cache when only one SRAM contains the selected data. This represents a significant waste of operational power, particularly in battery operated devices such as cellular telephones which may use such microprocessor systems.

To avoid the needless consumption of power by the way which does contain the desired data, some set associative cache memories have been provided with prediction logic. These systems all provide for a prediction of which way contains the requested data, and enable only the predicted way to produce the data. However, the prediction logic consumes power, and does not guarantee 100% predictability. Accordingly, more cache misses occur on a false prediction with only a marginal savings in power consumption.

In order to reduce power consumption, some designs reduce voltage levels or the operating frequency of the access cycle. There are limitations, however, to these techniques particularly lowering the operating frequency, since providing adequate time to make a set decision, and then obtain the required data, mandates a reduced maximum frequency of operation.

In a paper entitled, "A 600 MHz Single Chip Multiprocessor With 4.8 GB/s Internal Shared Piplined bus and 512 kB Internal Memory", 2003 International Solid-State Circuits Conference, pg. 254, a set associative instruction cache is described having reduced power consumption for normal prefetch cycles. Tag memory access and data memory access are divided into two consecutive cycles and only one way is activated. On the other hand during branch conditions, tag memory access and data memory access of both ways are executed in the same cycle to enhance the performance. In this way, there are two variations of cache performance, one emphasizing low power and the other high performance. However, the trade off between power savings and obtaining higher access speed is limited to normal prefetch and branch conditions. Further, the access during normal prefetch operations are made over two cycles which significantly slows down the access process. Accordingly, it would be desirable to have a system which can be morphed between high performance, as well as a lower power consumption, in a variety of applications.

BRIEF SUMMARY OF THE INVENTION

In accordance with the invention, a system and method are provided for accessing an associative data cache having at least two ways for storing data. First and second tag memories are provided for storing first and second sets of tags identifying each line of data stored in the ways of the cache memory. A translation device determines from the system address a tag identifying one of the ways obtaining data. First and second comparators compare the tag to a tag stored in first and second respective tag memories having the same address as the address applied to the first and second ways. When one of the comparator generates a signal, a multiplexer selects the corresponding way having the desired data. A clock signal circuit receives an access mode signal which controls whether one, both, or neither of the ways are clocked, depending on whether a power efficiency mode, or high access speed mode, is to be employed.

In accordance with a preferred embodiment of the invention, the system can be selectively operated at optimum access speed or at optimum power efficiency. The power efficiency mode may be implemented by detecting the access cycle frequency, and when the cycle time is adequate to allow a serial access of the cache way which contains the desired data, the system accesses at most only one way. Further, when the access frequency is higher, demanding a high access speed, both ways are clocked and a late select signal is used to select the access data from one the way containing the desired data.

DESCRIPTION OF THE PREFERRED EMBODIMENT

Figure 1:
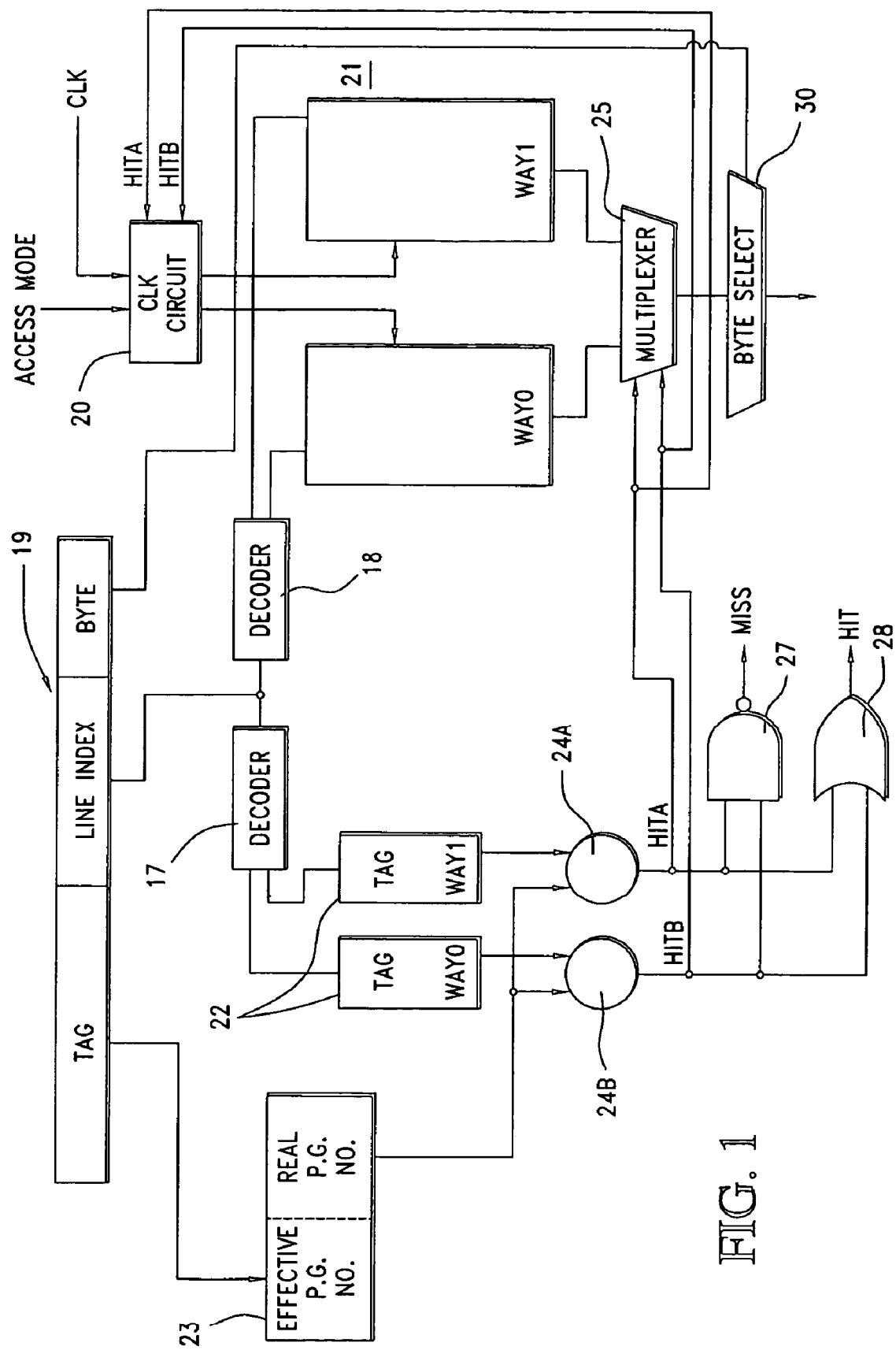
FIG. 1 illustrates a first embodiment of the invention for controlling the access mode of an associative cache memory.

Referring now to FIG. 1, a two way associative cache 21 is shown. Way 0, and way 1 comprise two SRAMs which produce first and second data outputs to a select multiplexer 25. The data cache memory 21 stores instructions, or other data necessary for a microprocessing system. The specific use of the data is not relevant to the invention's operation.

The cache 21 is accessed from an effective address register 19 containing an effective address. The effective address register 19 contains data representing a tag associated with each line of memory in way 0 and way 1, a line index and a byte number. The Line Index portion of the effective address register 19 identifies which line of the ways is to be accessed, and the byte identification data permits selection of a particular byte contained in a line of data.

For each line or row of data contained in way 0 and way 1, a tag in a corresponding row of tag memories 22 is provided. The Line Index addresses both tag memories and both ways 0, 1, The tag data stored in tag memories 22 identified by the Line Index is compared with the effective address register 19 tag data to determine which way contains data defined by effective address register 19. The tag memory producing a tag which corresponds to the tag in effective address register 19 corresponds to the way containing the desired data. In the event that neither tag memory 22 produces a corresponding tag, a cache miss occurs and the data must be recovered from the system main memory.

Using a conventional translational look aside buffer 23, the tag information from effective address register 19 can be reduced to an effective page number and a real page number corresponding to the tag associated with a row of memory in way 0, and way 1. Comparators 24A and 24B identify one of the ways of the cache memory array 21 when one of the tag memories 22 produces a tag corresponding to the tag obtained from the effective address register 19. Decoder 17 and decoder 18 are connected to tag memories 22 and the effective address register 19, respectively.

Figure 2:
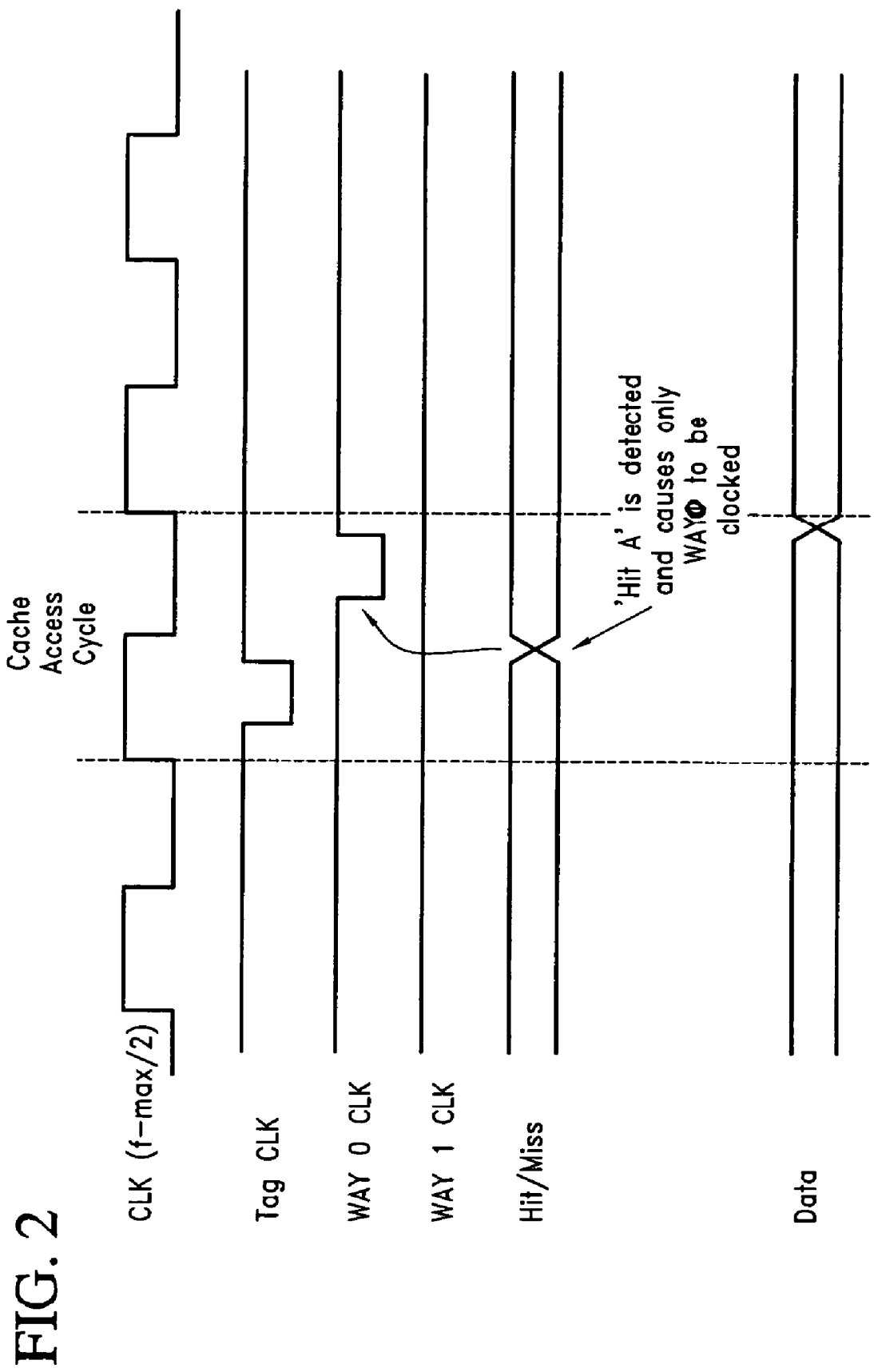
FIG. 2 illustrates the timing of the circuit of FIG. 1 when the power efficiency mode is selected.

The cache memory array may be operated in either a power efficiency access mode, or in a high speed access mode. The power efficiency access mode is illustrated in FIG. 2. Clock pulses CLK0 or CLK1 are applied to only one of the ways. The selection of which way is to be clocked to produce data is made based on the determination of which way includes the data defined by the effective address register 19. When the access cycle is slow enough to permit a single way to be clocked, and data is produced prior to the end of the access cycle, only one of the ways (shown as way 0 in FIG. 2) is clocked if a hit is determined. A further selection of an individual byte in the data selected by multiplexer 25 is possible by the select circuit 30 in accordance with the byte data contained in the effective address register 19.

As is conventional in other associative cache memory systems, a miss or hit indication is produced by, respectively, NAND gate 27, or OR gate 28 so that the system can confirm that the data being sought was available, or was not available requiring the system to recover the data from system memory.

When the microcomputing system is running an application which permits the power efficiency mode to operate, based on an assessment that sufficient cycle time is available to permit identification of the way containing the data defined by the line index of the effective address register 19, only one of the ways 21 is clocked if a hit is determined.

Figure 3:
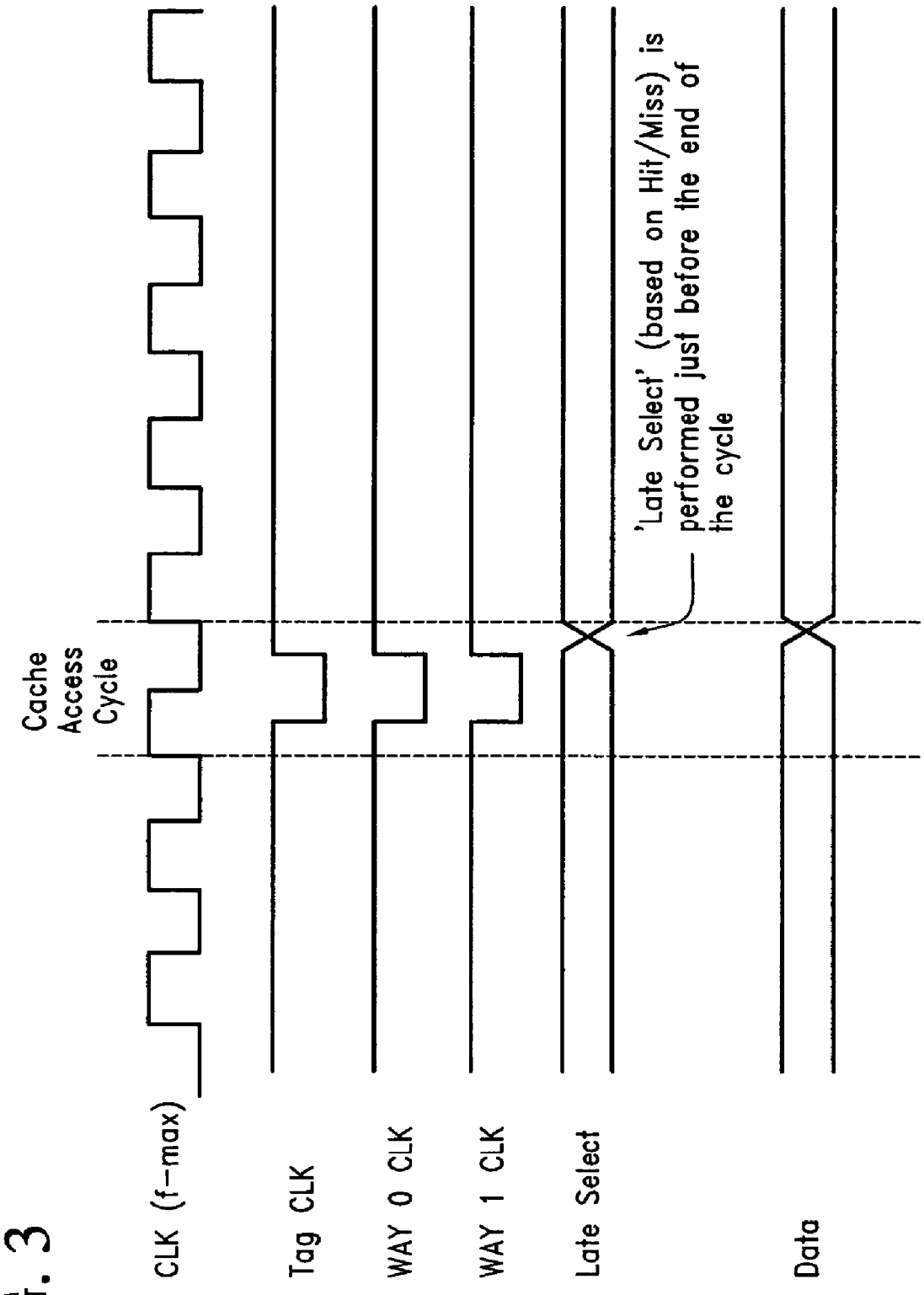
FIG. 3 illustrates the timing of the circuit of FIG. 1 when the high speed access mode is selected.

The high speed access mode which is used when the access cycle is reduced may be selected by clocking both ways of the cache memory 21. With the access mode set in the high speed access mode, both ways, way 0, way 1 are clocked as shown in FIG. 3, and a tag comparison is made with comparators 24. A late select signal is generated to select one or the other data outputs from way 0, or way 1 at the end of the access cycle. The byte select circuit 30 further distinguishes which byte or bytes of a line contained in the selected way is to be selected.

Figure 4:
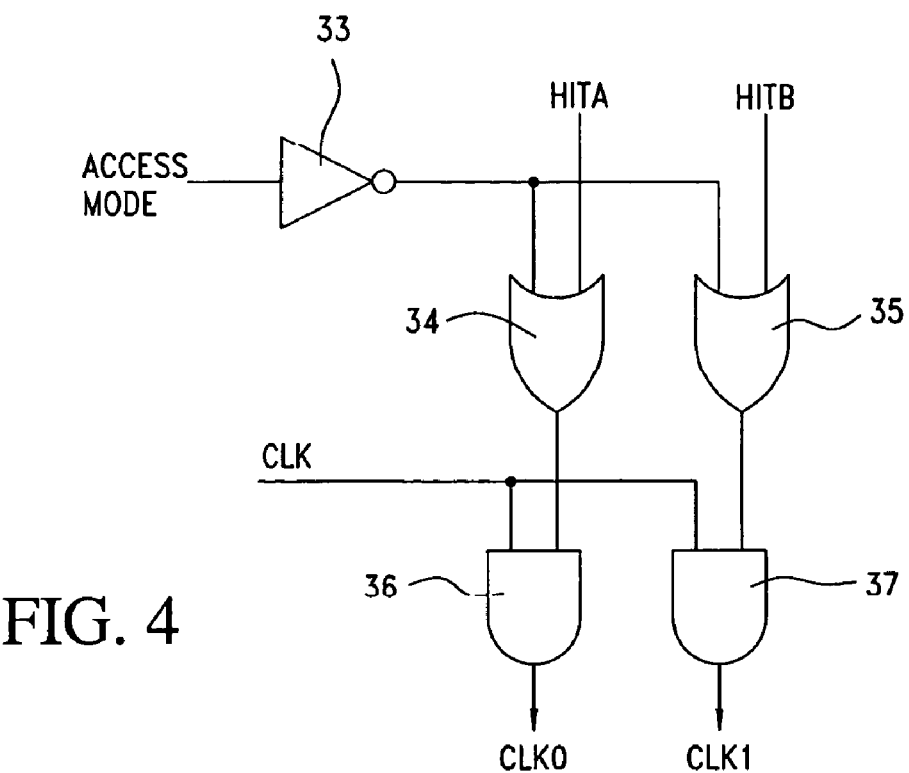
FIG. 4 illustrates a logic diagram of the access control circuitry of FIG. 1.

An arrangement for providing clock circuit 20 is shown in FIG. 4. Referring now to FIG. 4, an access mode indication is applied to inverter 33. When the high speed access mode is selected, AND gates 36 and 37 are enabled in response to each received clock pulse to provide clock 0 and clock 1 signals to each of the ways of cache memory 21. When the high power efficiency mode is selected, comparators 24A and 24B enable either AND gate 36 or 37, through OR gates 34 or 35, thus providing clocking signals to only one way of the cache memory.

Figure 5:
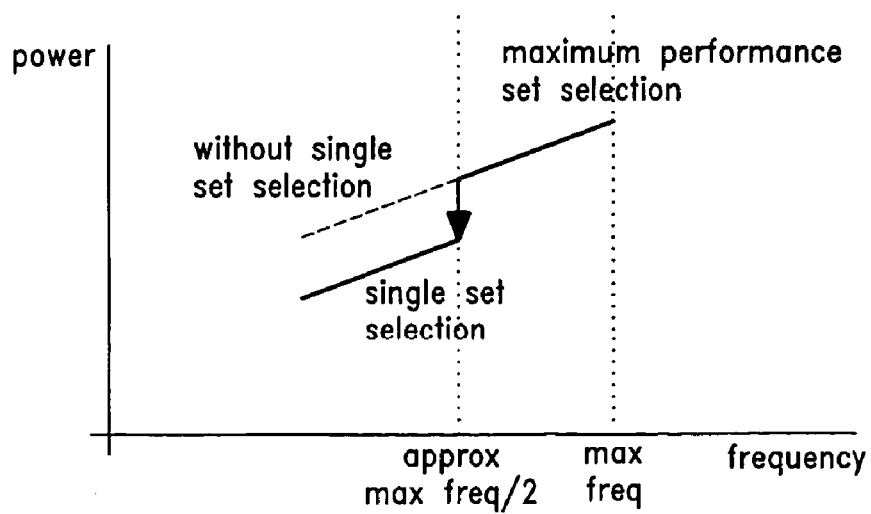
FIG. 5 illustrates the selection of a mode of operation based on power and frequency of the cache memory access.

The access mode may be controlled by system parameters, such as operating frequency, so that the determination can be made when the high power efficiency mode may be entered, or when the higher speed access mode is necessary for acquiring data in the cache memory 21. FIG. 5 illustrates the theoretical power consumption in both modes of operation of the circuit of FIG. 1. As can be seen from FIG. 5, during the power efficiency access mode, which is selected to occur when the frequency of data access is below a maximum frequency/2, significant power consumption efficiencies are obtained. Using the high speed access mode, where a late select is used to select one of the two way set associative cache memories, approximately 50% of the total power consumed is used in accessing the pair of ways. Accordingly, switching to the power efficiency mode lowers the total micro-processing system power consumption by 25%.

Accordingly, the system can be morphed from the high access speed mode, sacrificing power efficiency, to the lower access speed power efficient mode. Changing access mode between power efficiency and high speed access can be implemented by determining the required access time. Control over the access mode can be either by software, based on parameters of the application being run in the microcomputer system, or manually implemented when it is known that a given micro processing system is dedicated to a particular application.

While the foregoing system has been disclosed to select between either one way activation, or two way, late select activation, is to be understood that the system could also be used to select between the prediction access mode and/or the late select, high speed operation. In this way, those applications requiring high speed access, both ways may be accessed with a late select feature, and in those applications where power is to be conserved, the prediction mode may be entered and used to select which way contains the requested data.

The foregoing description of the invention illustrates and describes the present invention. Additionally, the disclosure shows and describes only the preferred embodiments of the invention in the context of a power optimized cache set selection, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the

What is claimed is:

1. A system for accessing a two way associative cache having first and second ways, comprising:
   a clock circuit for selectively applying clock pulses to one or to both ways of said two way associative cache in response to an access mode signal, a HITA signal and a HITB signal;
   an effective address register connected to simultaneously apply an address to each of said two way associative cache;
   an output multiplexer for selecting data from one of said first and second ways of said two way associative cache in response to a select signal identifying one of said ways of said associative cache; and
   a byte select circuit configured to select an individual byte of the data selected by the output multiplexer in accordance with byte data contained in the effective address register,
   wherein, in a power efficiency access mode, the clock circuit is configured such that the access mode signal enables the HITA signal and the HITB signal to select one of said first way and second way to apply clock pulses to at an end of an access cycle, and
   wherein, in a high speed access mode, the clock circuit is configured such that the access mode signal disables the HITA signal and the HITB from selecting both of said first way and second way have clock pulses applied.

2. A system for accessing a two way associative data cache according to claim 1 further comprising:
   a tag array connected to be addressed by said address circuit for storing first and second sets of tag signals corresponding to a corresponding set of data stored in said first and second ways; and
   first and second comparators connected to compare first and second output data from said tag array with tag data derived from said address,
   thereby identifying one of said ways of said associative caches containing data to be read, said one comparator generating the select signal for said output multiplexer.

3. The system according to claim 1 wherein said access mode signal applies clock pulses to both ways of said associate cache when the access time for reading said data from one of said sets is less than a predetermined amount.

4. The system according to claim 1 wherein said access mode signal is generated from prediction logic which predicts which of said first and second ways of said two way associative cache contains said data.

5. The system according to claim 2 wherein said clock circuit receives data from said comparator identifying which of said ways of said associative cache is to be clocked.

6. The system according to claim 5 wherein in a high speed access mode, said clock circuit receives an access mode signal which indicates that both of said sets of associative cache are to be clocked simultaneously.

7. The system according to claim 6 wherein said access mode signal is selected based upon a need to conserve power by only applying clock pulses to one way of said data cache, or to provide higher access speed to said data cache by applying clock pulses to both ways of said data cache.

8. A system for accessing a data cache having at least two ways for storing data at the same addresses, comprising:
   a first and second tag memory for storing first and second sets of tags identifying data stored in each of said ways;
   a translation device for determining from a system address a tag identifying one of said ways;
   a first comparator for comparing tags in said address with a tag stored in said first tag memory;
   a second comparator for comparing a tag in said address with a tag stored in said second tag memory;
   a multiplexer for selecting output data from one of said ways in response to a select signal from one of said first and second comparators;
   a byte select circuit configured to select an individual byte of the data selected by the output multiplexer in accordance with byte data contained in the effective address register; and
   a clock signal circuit for supplying clock signals to one or both of said ways in response to an access mode signal, a HITA signal and a HITB signal,
   wherein, in a power efficiency access mode, the clock circuit is configured such that the access mode signal enables the HITA signal and the HITB signal to select one of said first way and second way to apply clock pulses to at an end of an access cycle, and
   wherein, in a high speed access mode, the clock circuit is configured such that the access mode signal disables the HITA signal and the HITB from selecting and both of said first way and second way have clock pulses applied.

9. The system according to claim 8 wherein said access mode signal has a first state which represents the power efficiency access mode of operation.

10. The system according to claim 9 wherein said access mode signal has a second state which represents a high speed access mode for said cache.

11. The system according to claim 9 wherein said access mode signal is in said first state when said access speed is one half of a maximum access speed for said cache.

12. A method for accessing a set associative data cache comprising at least two ways, comprising:
   determining from an effective address tag associated with data stored in one of said ways;
   addressing said first and second ways with identical Line Index addresses derived from said effective address;
   addressing first and second tag memories with said Line Index address applied to said first and second ways;
   determining whether said first or second tag memories produce a tag identical to said tag determined from said effective addresses;
   supplying clock signals to one or both of said ways in response to an access mode signal, a HITA signal and a HITB signal;
   selecting an individual byte of data selected by an output multiplexer in accordance with byte data contained in an effective address register; and
   reading data from one of said ways in response to a first state of an access mode signal, and reading data from both of said ways when said access mode signal has a second state,
   wherein, in a power efficiency access mode, the clock circuit is configured such that the access mode signal enables the HITA signal and the HITB signal to select one of said first way and second way to apply clock pulses to at an end of an access cycle, and
   wherein, in a high speed access mode, the clock circuit is configured such that the access mode signal disables the HITA signal and the HITB from selecting and both of said first way and second way have clock pulses applied.

13. The method for accessing a set associative data cache according to claim 12 wherein said first state of said access mode signal is selected when said data cache is read in a power conserving mode, and said second state of said access signal is selected when said data cache is operated in a high speed access mode.

14. The method for accessing a set associative data cache according to claim 12 wherein said access mode signal controls a clock circuit that applies a clocking signal to said first way in said first state, and applies clocking signals to both ways when said access mode signal is in said second state.

15. A system for accessing a data cache having at least two ways for storing data at the same addresses, comprising:
- a first and second tag memory for storing first and second sets of tags identifying data stored in each of said ways;
- a translation device for determining from a system address a tag identifying one of said ways;
- a first comparator for comparing tags in said address with a tag stored in said first tag memory;
- a second comparator for comparing a tag in said address with a tag stored in said second tag memory;
- a multiplexer for selecting output data from one of said ways in response to a select signal from one of said first and second comparators; and
- a clock signal circuit for supplying clock signals to one or both of said ways in response to an access mode signal, a HITA signal and a HITB signal, wherein said access mode signal has a first state which represents a power efficiency access mode of operation and said access mode signal is in said first state when said access speed is one half of a maximum access speed for said cache, and wherein, in a power efficiency access mode, the clock circuit is configured such that the access mode signal enables the HITA signal and the HITB signal to select one of said first way and second way to apply clock pulses to at an end of an access cycle, and wherein, in a high speed access mode, the clock circuit is configured such that the access mode signal disables the HITA signal and the HITB from selecting and both of said first way and second way have clock pulses applied.

16. The system according to claim 15 wherein said access mode signal has a second state which represents a high access speed for said cache.

* * * * *